United States Patent
Brunner

(10) Patent No.: US 8,208,114 B2
(45) Date of Patent: Jun. 26, 2012

(54) DRIVE APPARATUS WITH IMPROVED TESTING PROPERTIES

(75) Inventor: Matthias Brunner, Kirchheim (DE)

(73) Assignee: AKT Electron Beam Technology GmbH, Feldkirchen (DE)

( * ) Notice: Subject to any disclaimer, the term of this patent is extended or adjusted under 35 U.S.C. 154(b) by 680 days.

(21) Appl. No.: 12/355,698

(22) Filed: Jan. 16, 2009

(65) Prior Publication Data

US 2009/0122056 A1    May 14, 2009

Related U.S. Application Data

(63) Continuation of application No. PCT/EP03/06481, filed on Jun. 18, 2003.

(30) Foreign Application Priority Data

Jun. 19, 2002   (DE) .................................. 102 27 332

(51) Int. Cl.
G02F 1/1345   (2006.01)
(52) U.S. Cl. ...................................... 349/151
(58) Field of Classification Search .................... 349/151
See application file for complete search history.

(56) References Cited

U.S. PATENT DOCUMENTS

| | | | |
|---|---|---|---|
| 3,983,401 A | 9/1976 | Livesay | |
| 4,090,056 A | 5/1978 | Lockwood et al. | |
| 4,362,945 A | 12/1982 | Riecke et al. | |
| 4,437,044 A | 3/1984 | Veith et al. | |
| 4,456,910 A | 6/1984 | DiMassimo et al. | |
| 4,495,966 A | 1/1985 | Longamore | |
| 4,528,452 A | 7/1985 | Livesay | |
| 4,532,423 A | 7/1985 | Tojo et al. | |
| 4,684,808 A | 8/1987 | Plies et al. | |
| 4,725,736 A | 2/1988 | Crewe | |
| 4,740,705 A | 4/1988 | Crewe | |
| 4,760,567 A | 7/1988 | Crewe | |
| 4,761,607 A | 8/1988 | Shiragasawa et al. | |
| 4,764,818 A | 8/1988 | Crew | |
| 4,795,912 A | 1/1989 | Maschke | |
| 4,819,038 A | 4/1989 | Alt | |
| 4,843,312 A | 6/1989 | Hartman et al. | |

(Continued)

FOREIGN PATENT DOCUMENTS

DE   3636316   4/1987

(Continued)

OTHER PUBLICATIONS

Office Action for Taiwan Patent Application No. 92116249 dated Jul. 28, 2009.

(Continued)

*Primary Examiner* — Sung Pak
(74) *Attorney, Agent, or Firm* — Patterson & Sheridan, L.L.P.

(57) ABSTRACT

Embodiments of the present invention relate to a drive electronics for driving a display with a matrix 101 of picture elements. The drive circuit 102x and 102y for generating signals for driving the pixels via control lines 103 is provided with signals at the input terminals 110 via contact areas 104. In addition to the contact areas used for the generation of arbitrary pictures, there exist contact areas 105 used within the framework of a testing method. These contact areas for the testing method are also connected with the input terminals 110 of the drive circuit and are used for generating a test pattern.

10 Claims, 6 Drawing Sheets

U.S. PATENT DOCUMENTS

| | | |
|---|---|---|
| 4,862,075 A | 8/1989 | Choi et al. |
| 4,870,357 A | 9/1989 | Young et al. |
| 4,899,105 A | 2/1990 | Akiyama et al. |
| 4,965,515 A | 10/1990 | Karasawa et al. |
| 4,983,833 A | 1/1991 | Brunner et al. |
| 4,985,676 A | 1/1991 | Karasawa et al. |
| 4,985,681 A | 1/1991 | Brunner et al. |
| 5,081,687 A | 1/1992 | Henley et al. |
| 5,124,635 A | 6/1992 | Henley |
| 5,170,127 A | 12/1992 | Henley |
| 5,175,495 A | 12/1992 | Brahme et al. |
| 5,177,437 A | 1/1993 | Henley |
| 5,258,706 A | 11/1993 | Brunner et al. |
| 5,268,638 A | 12/1993 | Brunner et al. |
| 5,278,494 A | 1/1994 | Obigane et al. |
| 5,285,150 A | 2/1994 | Henley et al. |
| 5,313,156 A | 5/1994 | Klug et al. |
| 5,368,676 A | 11/1994 | Nagaseki et al. |
| 5,369,359 A | 11/1994 | Schmitt et al. |
| 5,371,459 A | 12/1994 | Brunner et al. |
| 5,414,374 A | 5/1995 | Brunner et al. |
| 5,430,292 A | 7/1995 | Honjo et al. |
| 5,432,461 A | 7/1995 | Henley |
| 5,504,438 A | 4/1996 | Henley |
| 5,528,158 A | 6/1996 | Sinsheimer et al. |
| 5,530,370 A | 6/1996 | Langhof et al. |
| 5,558,717 A | 9/1996 | Zhao et al. |
| 5,621,333 A | 4/1997 | Long et al. |
| 5,644,245 A | 7/1997 | Saitoh et al. |
| 5,657,139 A | 8/1997 | Hayashi et al. |
| 5,691,764 A | 11/1997 | Takekoshi et al. |
| 5,742,173 A | 4/1998 | Nakagomi et al. |
| 5,774,100 A | 6/1998 | Aoki et al. |
| 5,801,545 A | 9/1998 | Takekoshi et al. |
| 5,801,764 A | 9/1998 | Koizumi et al. |
| 5,834,007 A | 11/1998 | Kubota et al. |
| 5,834,773 A | 11/1998 | Brunner et al. |
| 5,892,224 A | 4/1999 | Nakasuji |
| 5,923,180 A | 7/1999 | Botka et al. |
| 5,930,607 A | 7/1999 | Satou et al. |
| 5,936,687 A | 8/1999 | Lee et al. |
| 5,945,984 A | 8/1999 | Kuwashiro |
| 5,973,323 A | 10/1999 | Adler et al. |
| 5,982,190 A | 11/1999 | Toro-Lira |
| 5,994,916 A | 11/1999 | Hayashi |
| 6,046,599 A | 4/2000 | Long et al. |
| 6,075,245 A | 6/2000 | Toro-Lira |
| 6,086,362 A | 7/2000 | White et al. |
| 6,137,303 A | 10/2000 | Deckert et al. |
| 6,188,453 B1 | 2/2001 | Matsuoka et al. |
| 6,198,299 B1 | 3/2001 | Hollman |
| 6,265,889 B1 | 7/2001 | Tomita et al. |
| 6,281,701 B1 | 8/2001 | Yang et al. |
| 6,288,561 B1 | 9/2001 | Leedy |
| 6,297,656 B1 | 10/2001 | Kobayashi et al. |
| 6,320,568 B1 | 11/2001 | Zavracky |
| 6,337,772 B2 | 1/2002 | Uehara et al. |
| 6,340,963 B1 | 1/2002 | Anno et al. |
| 6,343,369 B1 | 1/2002 | Saunders et al. |
| 6,362,013 B1 | 3/2002 | Yoshimura et al. |
| 6,380,729 B1 | 4/2002 | Smith |
| 6,435,868 B2 | 8/2002 | White et al. |
| 6,437,596 B1 | 8/2002 | Jenkins et al. |
| 6,486,927 B1 | 11/2002 | Kim |
| 6,559,454 B1 | 5/2003 | Murrell et al. |
| 6,566,897 B2 | 5/2003 | Lo et al. |
| 6,570,553 B2 | 5/2003 | Hashimoto et al. |
| 6,636,288 B2 | 10/2003 | Kim et al. |
| 6,730,906 B2 | 5/2004 | Brunner et al. |
| 6,765,203 B1 | 7/2004 | Abel |
| 6,777,675 B2 | 8/2004 | Parker et al. |
| 6,828,587 B2 | 12/2004 | Yamazaki et al. |
| 6,833,717 B1 | 12/2004 | Kurita et al. |
| 6,924,875 B2 | 8/2005 | Tomita |
| 7,355,418 B2 | 4/2008 | Brunner et al. |
| 7,388,397 B2* | 6/2008 | Tomita ............... 324/760.02 |
| 2001/0052788 A1 | 12/2001 | Tomita |
| 2002/0024023 A1 | 2/2002 | Brunner et al. |
| 2002/0034886 A1 | 3/2002 | Kurita et al. |
| 2002/0047838 A1 | 4/2002 | Aoki et al. |
| 2003/0218456 A1 | 11/2003 | Brunner et al. |
| 2005/0212782 A1* | 9/2005 | Brunner ............... 345/204 |
| 2006/0156111 A1* | 7/2006 | Nozawa ............... 714/724 |
| 2006/0279667 A1* | 12/2006 | Tsai et al. ............ 349/40 |

FOREIGN PATENT DOCUMENTS

| | | |
|---|---|---|
| DE | 19832297 | 1/1999 |
| EP | 0370276 | 5/1990 |
| EP | 0402499 | 12/1990 |
| EP | 0523584 | 1/1993 |
| EP | 0523594 | 1/1993 |
| EP | 0537505 | 4/1993 |
| EP | 0542094 | 5/1993 |
| EP | 0614090 | 9/1994 |
| EP | 0762137 | 3/1997 |
| EP | 0806700 | 11/1997 |
| EP | 0932182 | 7/1999 |
| EP | 0999573 | 5/2000 |
| EP | 1045425 | 10/2000 |
| EP | 1045426 | 10/2000 |
| EP | 1233274 | 8/2002 |
| JP | 57099693 | 6/1982 |
| JP | 8173418 | 2/1984 |
| JP | 60039748 | 3/1985 |
| JP | 63088741 | 4/1988 |
| JP | 63088742 | 4/1988 |
| JP | 63166132 | 7/1988 |
| JP | 63318054 | 12/1988 |
| JP | 1213944 | 8/1989 |
| JP | 1307418 | 12/1989 |
| JP | 05004044 | 1/1993 |
| JP | 6167538 | 6/1994 |
| JP | 7302563 | 11/1995 |
| JP | 07-333275 | 12/1995 |
| JP | 07333275 | 12/1995 |
| JP | 08-201841 | 8/1996 |
| JP | 08201841 | 8/1996 |
| JP | 08289231 | 11/1996 |
| JP | 11264940 | 9/1999 |
| JP | 2000-003142 | 1/2000 |
| JP | 2000003142 | 1/2000 |
| JP | 2000180392 | 6/2000 |
| JP | 2000223057 | 8/2000 |
| JP | 2000268764 | 9/2000 |
| JP | 2001-053282 | 2/2001 |
| JP | 2001033408 | 2/2001 |
| JP | 2001-215463 | 8/2001 |
| JP | 2001215463 | 8/2001 |
| JP | 2001318116 | 11/2001 |
| JP | 2001358189 | 12/2001 |
| JP | 2002-040464 | 2/2002 |
| JP | 2002039976 | 2/2002 |
| JP | 2002040464 | 2/2002 |
| JP | 2002048740 | 2/2002 |
| JP | 2002257997 | 9/2002 |
| JP | 2002310959 | 10/2002 |
| JP | 2002343294 | 11/2002 |
| JP | 2004014402 | 1/2004 |
| WO | WO-9960614 | 1/1977 |
| WO | WO-9209900 | 6/1992 |
| WO | WO-9831050 | 7/1998 |
| WO | WO-9923684 | 5/1999 |
| WO | WO-0233745 | 4/2002 |

OTHER PUBLICATIONS

Brunner, et al., "Development of Puma 5500/10K Platform", AKTNews, vol. 5, Jan. 2001, p. 13-14.

Brunner, M., "TFT Array Testing: Replacing Mechanics by Electron Beam Deflection, "AKTNews vol. 6, Apr. 2001, p. 15-17.

Invitation to Pay Additional Fees dated Oct. 21, 2003 for corresponding PCT application, PCT/US03/15903.

PCT International Search Report for PCT/US03/15903, dated Jan. 16, 2004.

PCT English Translation of International Preliminary Exam RPT for PCT/EP03/06481, dated Dec. 13, 2004.

Kumada, et al., "Non-Contact Array testers."

European Search Report for EP 03 026 267.9, dated Apr. 5, 2004.
German Office Action from German Application No. 102 27 332.4, dated Jun. 19, 2002.
Notice of Reasons for Rejection issued Nov. 26, 2008 in Japanese Patent Application No. 2004-515792 (JAPA P).

PCT International Search Report from International Application PCT/EP03/06481, dated Dec. 5, 2003.

* cited by examiner

| A | C | A | C |
|---|---|---|---|
| B | D | B | D |
| A | C | A | C |
| B | D | B | D |
| A | C | A | C |
| B | D | B | D |
| A | C | A | C |
| B | D | B | D |

Fig. 4

DRIVE APPARATUS WITH IMPROVED TESTING PROPERTIES

CROSS-REFERENCE TO RELATED APPLICATIONS

This application is a continuation of the National Stage of International Application No. PCT/EP2003/006481, filed Jun. 18, 2003, which claims the benefit of German Patent Application DE 102 27 332.4, filed Jun. 19, 2002. Each of the aforementioned related patent applications is herein incorporated by reference in its entirety.

BACKGROUND OF THE INVENTION

1. Field of the Invention

Embodiments of the present invention relate to the testing of an optoelectronic device and to an optoelectronic device modified for testing. Thereby, the optoelectronic device has the form of a display device with pixels. Particularly, embodiments of the present invention relate to a drive electronics for driving an optoelectronic device, an arrangement of test contact areas and a method for testing an optoelectronic device, especially having the form of a display with pixels.

2. Description of the Related Art

Together with the increasing demand for display elements without a cathode ray tube, the requirements for liquid crystal displays (LCD and other display elements using switching elements like, e.g., thin film transistors (TFT) increase. In these display elements the so-called pixels are arranged in a matrix.

In general, the switching elements of each pixel are driven via control lines, i.e. gate lines, and data lines. In order to avoid charging of the pixel elements, the control lines can be shorted via shorting bars during manufacturing. Otherwise, charging of the pixel elements may result in destruction of the switching elements or the corresponding pixels.

Moreover, developments are underway to—in addition to the pixel elements—apply peripheral drive circuits directly to the glass substrate. Thus, the external driving of the display elements is simplified. Such a display apparatus with integrated drive circuits is described in document DE 198 32 297. In this event, the number of contact areas required for the picture control can be reduced. Without such drive circuits, each control line must have a contactable area to allow for picture control during operation. The areas contactable by an external control are also called pads.

To assure high picture quality, only very few of, e.g., several millions of pixels can be accepted to be defective. To provide low cost production, it is very important, especially for the ever larger display elements, to provide efficient online-testing methods. Such a testing method is disclosed, e.g., in EP 0 523 584. In this testing method, individual pixels are tested by a particle beam. The particle beam can be used to either detect the charge applied via the lines and/or apply charge to a pixel electrode.

Document U.S. Pat. No. 5,081,687 (Henley et al.) describes a method and apparatus for testing LCD displays. Therein, each second data line and each second gate line is connected with a shorting bar. A test picture is generated by driving the shorting bar. During testing, a voltage of, e.g., −5 V is applied to the electrodes of each second pixel and a voltage of, e.g., +5V is applied to the electrodes of the intermediate pixels to form a test picture. Such shorting bars cannot be provided together with integrated drive circuits without troubles because they will short-circuit the driver outputs.

Document U.S. Pat. No. 5,936,687 (Lee et al.) utilizing a drive circuit uses contact pads for generating a test picture, said contact pads being connected with a circuit in order to avoid electrostatic discharge (ESD). This circuit comprises shorting bars which are connected via diodes to the lines for driving the individual pixel elements. In document U.S. Pat. No. 6,337,772 (Ha et al.) transistors are used for connecting the shorting circuits with the control lines.

The following conditions have to be fulfilled if test pictures are generated via the shorting bars connected with a drive circuit. Either the drive circuits are not integrated at the time of the testing or the output terminals of the integrated circuits are formed such that they do not interfere with the test signals. In the majority of cases, this condition cannot be realized.

Furthermore, the following has to be considered. Shorting bars cannot always be realized due to reasons of process, space or circuitry. Also, the function of the drive circuits is not tested with such a solution. Moreover, only simple test patterns can be generated, wherein the periodically repeated unit cell of said test pattern cannot be larger than the number of shorting bars.

If using, for generating a test picture, the pads used during normal operation, especially for large display elements a plurality of contact areas must be contacted during testing. This is especially difficult when large display elements are tested since the display element must be shifted during the testing method. For smaller displays, a plurality thereof is arranged on the glass so that also in this case the glass plate must be repeatedly shifted during the testing procedure. Thus, increased requirements are demanded for the contacting block. The contacting block serves external signal input to the contact areas of the drive circuit or to the contact areas of the data lines or gate lines or the corresponding shorting bars.

Therefore, there is a need for drive apparatus with improved testing properties.

SUMMARY OF THE INVENTION

Embodiments of the present invention relate to the testing of an optoelectronic device and to an optoelectronic device modified for testing. Thereby, the optoelectronic device has the form of a display device with pixels. Particularly, Embodiments of the present invention relate to a drive electronics for driving an optoelectronic device, an arrangement of test contact areas and a method for testing an optoelectronic device, especially having the form of a display with pixels.

One embodiment of the present invention provides a drive electronics for driving an optoelectronic device with a matrix of picture elements having a drive circuit, wherein the drive circuit has input terminals and output terminals, a first arrangement of contact areas connected with the input terminals of the drive circuit, and a second arrangement of contact areas connected with the input terminals of the drive circuit, wherein the contact areas of the second arrangement of contact areas are larger than the contact areas of the first arrangement of contact areas.

Another embodiment of the present invention provides a method for testing an optoelectronic device comprising making contact between an external control and an arrangement of test contact areas which are larger than operational contact areas, providing an input terminal of a drive circuit with input signals via the arrangement of test contact areas to generate a test pattern on a matrix of picture elements and testing the picture elements of the matrix of picture elements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1b shows a cut out of the embodiment of the present invention shown in FIG. 1a.

FIG. 3b shows a cut out of the embodiment of the present invention shown in FIG. 3a.

FIG. 4 shows a diagram of a pixel representation of a test pattern.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
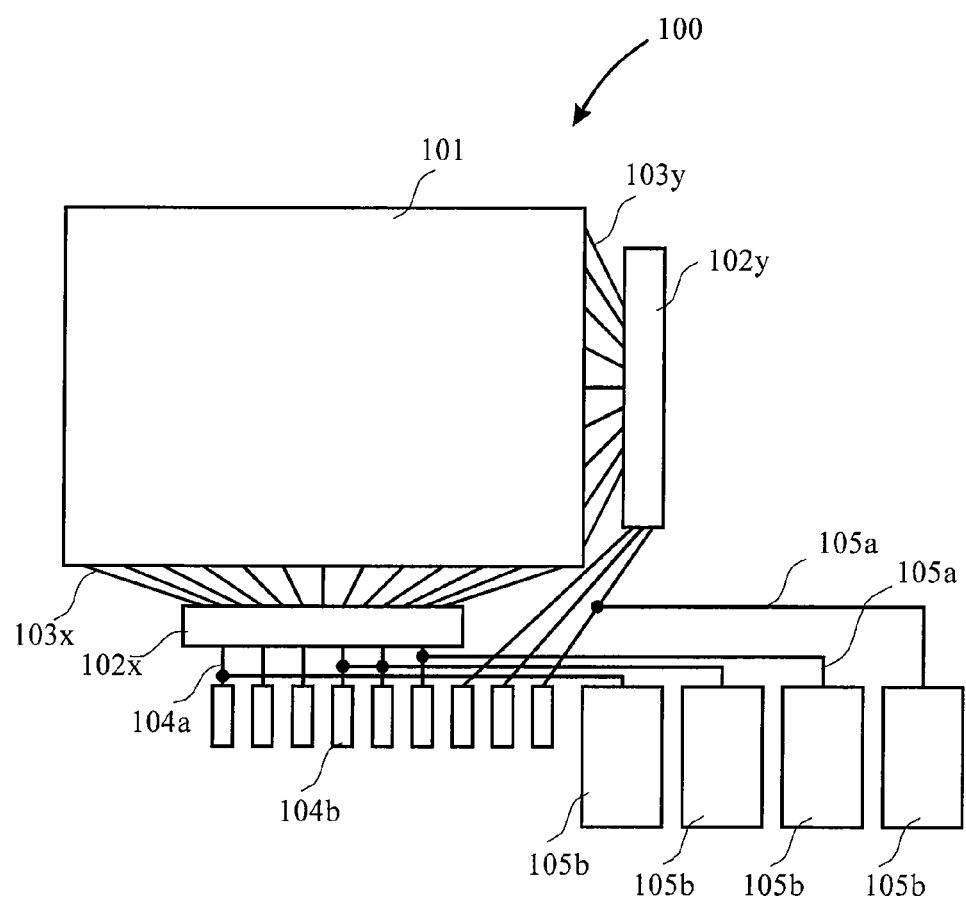
FIG. 1a shows a schematic view of an embodiment of the present invention.

Embodiments of the present invention relate to the testing of an optoelectronic device and to an optoelectronic device modified for testing. Thereby, the optoelectronic device has the form of a display device with pixels. Particularly, Embodiments of the present invention relate to a drive electronics for driving an optoelectronic device, an arrangement of test contact areas and a method for testing an optoelectronic device, especially having the form of a display with pixels.

The problems, mentioned in the background, of the prior art are solved by inventive apparatus according to claims 1, 13, 20 and 28 as well as the inventive method according to claims 22 and 29 filed in the PCT application /EP2003/006481, upon which the present application claims priority.

According to 7 an aspect of the invention, the object is solved by a drive electronics for driving an optoelectronic device with a matrix of picture elements. The drive electronics has a drive circuit with input terminals and output terminals. Further to this, the drive electronics includes a first arrangement of contact areas connected with the drive circuit and a second arrangement of contact areas connected with the drive circuit. Preferably, both arrangements of contact areas are connected with the input terminals of the drive circuit.

Furthermore, the first arrangement of contact areas has first contact areas and the second arrangement of contact areas has second contact areas. Preferably, the second contact areas of the second arrangement of contact areas are larger than the first contact areas of the first arrangement of contact areas.

The present invention allows to generate a test pattern which is sufficiently complex for the purpose of testing via the second arrangement of contact areas. For testing purposes, no arbitrary pictures have to be generated but patterns which are less complex compared to normal operation. Therefore, the number of contact areas for generating a test pattern can be reduced compared to the number of contact areas for generating an arbitrary picture during normal operation. This reduction of the number contact areas allows that the contact areas can be enlarged. Thus, it is possible to test display elements in a reliable, quicker and more effective fashion.

The drive electronics is preferably designed so that the number of input terminals of the drive circuit, by which the arrangement of contact areas for testing the drive circuit is connected, is at maximum 5%, preferably at maximum 1%, and especially preferred at maximum 0.5%, the number of output terminals of the drive circuit, by which the control lines to the picture elements of the display matrix are connected with the drive circuit.

According to another aspect of the invention, the object of the invention is solved by an arrangement of test contact areas for providing an optoelectronic device with signals for generating a test pattern. The optoelectronic device comprises a matrix of picture elements. This arrangement has at least one pad, i.e. at least one junction area, and at least one connection of the at least one pad to a drive circuit, wherein the drive circuit is provided with signals via an arrangement of operating contact areas during normal operation.

According to a further aspect of the present invention, the object is solved by an optoelectronic device with a matrix of picture elements, at least one drive circuit, a first arrangement of contact areas connected with the drive circuit and a second arrangement of contact areas connected with the drive circuit.

A further aspect for solving the object underlying the invention is a method for testing an optoelectronic device with the steps of: providing a contact between an external control and an arrangement of contact areas, providing input signals to an input terminal of the drive circuit via the arrangement of contact areas to generate a test pattern on a matrix of picture elements, and testing the picture elements of the matrix of picture elements.

A further aspect for solving the object underlying the present invention relates to a method for manufacturing a drive electronics of an optoelectronic device with a matrix of picture elements. Therein, the following steps are accomplished: a drive circuit is provided on a substrate, control lines of the matrix of picture elements are connected with output terminals of the drive circuit, a first arrangement of contact areas is provided on the substrate, the first arrangement of contact areas is connected with input terminals of the drive circuit, a second arrangement of contact areas is provided on the substrate, and the second arrangement of contact areas is connected with input terminals of the drive circuit.

Preferred embodiments and specific aspects of the invention are apparent from the dependent claims.

Embodiments of the invention are illustrated in the drawings and will be exemplarily explained along with the description of the drawings.

Figure 4:
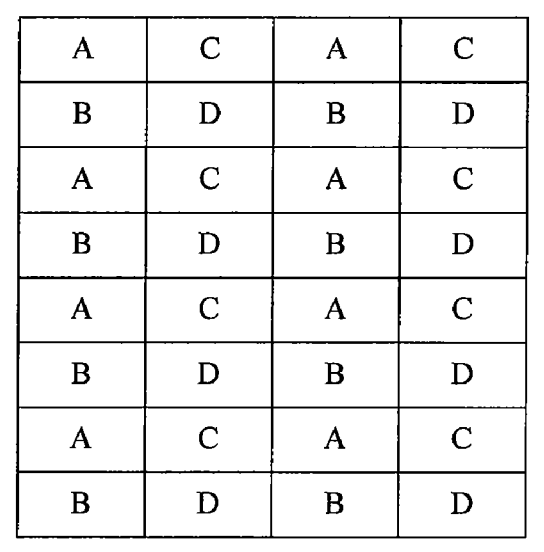
Figure 5:
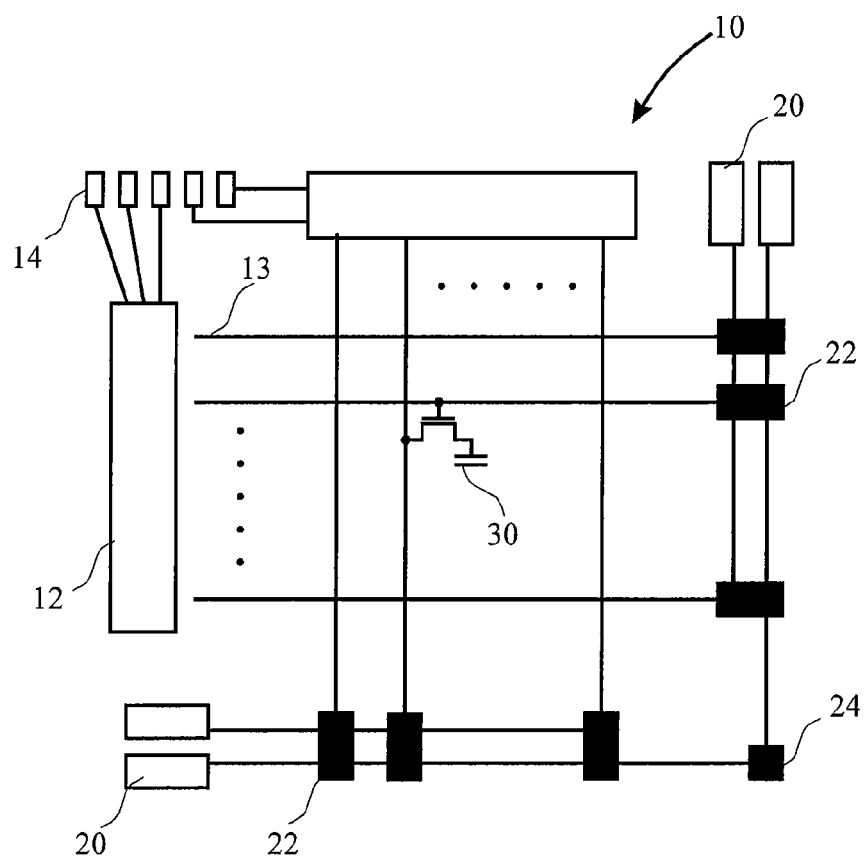
FIG. 5 shows a schematic view of a display element according to the prior art.

FIG. 5 is an embodiment according to the prior art. Therein, a schematic overview of a display element 10 is shown. The individual pixels 30 are connected with the drive circuits 12 via control lines 13 for driving the pixels. During normal operation, the drive circuits are externally provided with signals via contact areas 14. In FIG. 4, only five contact areas 14 are symbolically illustrated. However, several hundreds of these contact areas may be required for large display elements to provide the dive circuits with signals.

The control lines 13 are connected with a shorting circuit via switching elements 22. This shorting circuit against electrostatic discharge (ESD) provides protection either only against over-voltages and allows for applying normal operational voltages or can be switched off by means of the contact areas 20 during testing and during normal operation. The shorting circuits for the data lines and the gate lines are coupled to each other via the coupling circuits 24. All the above-described elements are integrated on the glass substrate.

This conventional embodiment has the following drawbacks. A test pattern for an online-testing method is generated via the contact areas 14 of the drive circuits. Since these contact areas are very small due to their number, contacting during the test procedure is difficult. This is especially true for large display elements which are so large that a mechanical shift must be accomplished during the test procedure. Such a shift may be necessary if, e.g., the deflection of a particle beam is not sufficient for testing the whole display. For a large number of contact areas with a size of, e.g., below 80 μm, highly advanced contacting technology must be employed to avoid erroneous testing due to erroneous contacting. The technical requirements increase even more if the size of the display requires shifting during testing.

For cost-effective testing, high speed must further be realized. Furthermore, additional requirements for the contacting mechanics are made by testing method. Taking this into consideration, it becomes apparent that the requirements cannot be fulfilled by the present prior art. Further requirements for the contacting mechanics for, e.g., the testing with a particle beam are: use in a vacuum environment, low magnetic field generation to not interfere with an electron beam or a measurement signal, and free access to the area of the pixel matrix for the particle beam.

Preferred aspects and embodiments of the present invention are now described with reference to FIGS. 1 to 4.

FIG. 1a shows a display element 100, like e.g. a display for a cell phone, a PC or a TV set. The pixels of the pixel matrix 101 are arranged matrix-like. For picture generation, the pixels are driven via control lines $103x$ and $103y$, respectively. Additionally, drive circuits $102x$ and $102y$ are provided on the substrate to facilitate the external driving for picture generation. Like pixel matrix 101, also the drive circuits are applied to the substrate during the manufacturing. The drive circuits are provided with signals by an external drive via pads 104b. Thereby, the signals are transmitted to the drive circuits via lines 104a. Pads 104b and lines 104a together form the contactable areas. They will be referred to also as contact areas in the following.

In practice, especially for large displays with many pixels up to more than hundred of these contact areas (104a and 104b) exist. Therefore, these contact areas cannot be designed sufficiently large due to the restricted available space to guarantee efficient and reliable testing. Taking for example a display with a size of 4 inches (640×480 pixels), these contact areas according to the prior art have a size of about 60 μm times 2000 μm. During testing of the display element and the individual pixels of the pixel matrix, resp., with, e.g., an electron beam the following criteria have to be fulfilled. Firstly, a test pattern must be generated via an external drive. The contacting of the pads 104b must be accomplished certainly and reliably. Due to the size of the display element, it may be necessary to move the display with respect to the electron beam. In order to provide high speed testing, the contacting must be continuously carried along or it must be detached and reattached as quick and reliable as possible. Furthermore, the contacting block providing the contacting must function under vacuum conditions and must not interfere with an electron beam and the electrons to be detected, resp., because testing with an electron beam is no longer possible.

An error-free and efficient contacting is difficult or even impossible under these boundary conditions. Therefore, additional contact areas for testing are provided according to the invention. They consist of the pads 105b and the lines 105a connected thereto. Since no arbitrary pictures but only sufficiently complex patterns have to be generated on the display for testing, the number of these test contact areas can be reduced compared to the number of contact areas used during normal operation. Compared to the number of operational contact areas, the number of test contact areas (105a and 105b) can be reduced to a maximum of 90%, preferably a maximum 50%, and more preferably a maximum of 20%. Thus, for, e.g., a large display about 30 contact areas for the testing method are provided in addition to the about 200 contact areas for normal operation whereas for a small display with about 30 contact areas for normal operation about 5 additional test contact areas are provided.

From this it follows that the number of input terminals of the drive circuit $102x$ connecting the drive circuit to the second arrangement of contact areas 105 has a maximum of 5% of the number of output terminals connecting the drive circuit to the control lines $103x$ of the matrix of pixels 101. This means that, according to the prior art, the pads used during testing are connected with the output terminals of a possible drive circuit via control lines. Typically, this drive circuit is a shorting bar attached to the control lines. In contrast to this, in the present invention the pads for generating a test picture are connected with the drive circuit via the input terminals of the drive circuit. The number of connections between test contact areas and input terminals of the drive circuit is reduced compared to the number of output terminals of the drive circuit connected with the control lines.

Therefore, it is possible to design the contact areas used for the test procedure in a fashion so that the pads 105b have a dimension of at least 100 μm, preferably at least 0.5 mm, and especially preferred at least 2 mm. The term dimension is to be understood as the expansion in a direction of the minimum value of expansion. Accordingly, the length of the shorter side of a rectangular pad must be considered the dimension. The above-mentioned dimension of the contact areas allows a reliable, quick and fault-immune contacting.

For generating a test pattern as it is described in more detail with reference to FIG. 4, the test pads 105b are connected with the lines 104a according to a first embodiment via lines 105a. The lines 104a are used for pads 104b of normal operation. Via these connections, one or more test pads can be connected with the input terminals of drive circuits $102x$ and/or $102y$. Furthermore, it is possible that a test pad is connected with multiple lines 104a for normal picture generation via switching elements or components (e.g. diodes, transistors or other components). An example for such a connection is illustrated in FIG. 1c with a switching element or component 120. Another option for connecting multiple lines with a test pad is a connecting structure, which is removed for normal operation. This means that the structure is cut off, e.g., during glass separation or by etch processes.

Accordingly, the present invention relates also to optoelectronic devices, e.g. in the form of displays, adapted for a testing method with first and second arrangements of contact areas according to the invention, the testing method being accomplished therewith and at least a part of the test arrangement being cut off after the testing method.

Since no arbitrary patterns have to be generated on the display for a testing method, it is not mandatory that all input terminals 110 of the drive circuit $102x$ can be driven during the tests. However, it may be of advantage when at least all input terminals are held on a defined potential to avoid floating of the input terminals. According to the present invention, test pads 105*b* can be connected with operating pads 104*b* via lines 105*a* of the test contact areas without departing from the gist of the present invention.

Figure 1B:
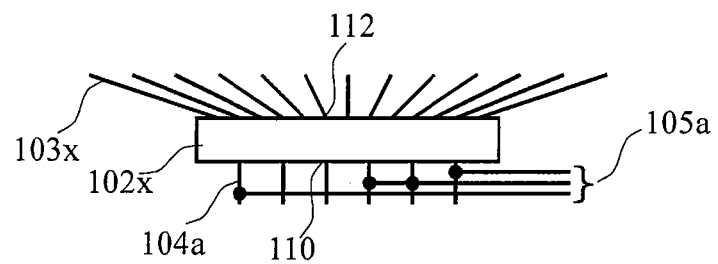
Figure 1C:
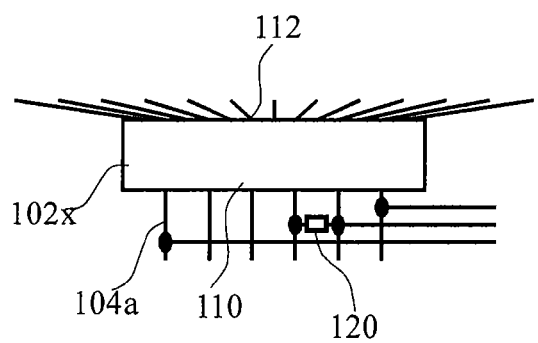
FIG. 1c shows an alternative of the section shown in FIG. 1b.

The terminals of a drive circuit 102*x* according to an embodiment of the present invention are shown in FIG. 1*b*. The control lines 103*x* for the pixel matrix 101 (not shown in FIG. 1*b*) are connected with the output terminals of drive circuit 102*x*. The lines 104*a* and 105*a*, respectively, are connected with the input terminals of the drive circuit.

Therein, according to the present invention the term "output terminal" of the drive circuit should be understood in that the output terminals are connected with the control lines used for controlling the individual pixels. An input terminal of the drive circuit should be considered as a terminal by which the drive circuit is provided with external signals. Thereby, these external signals are modified within the drive circuit to then provide signals for the picture elements to the control lines 103*x* coupled to the output terminals.

Figure 2:
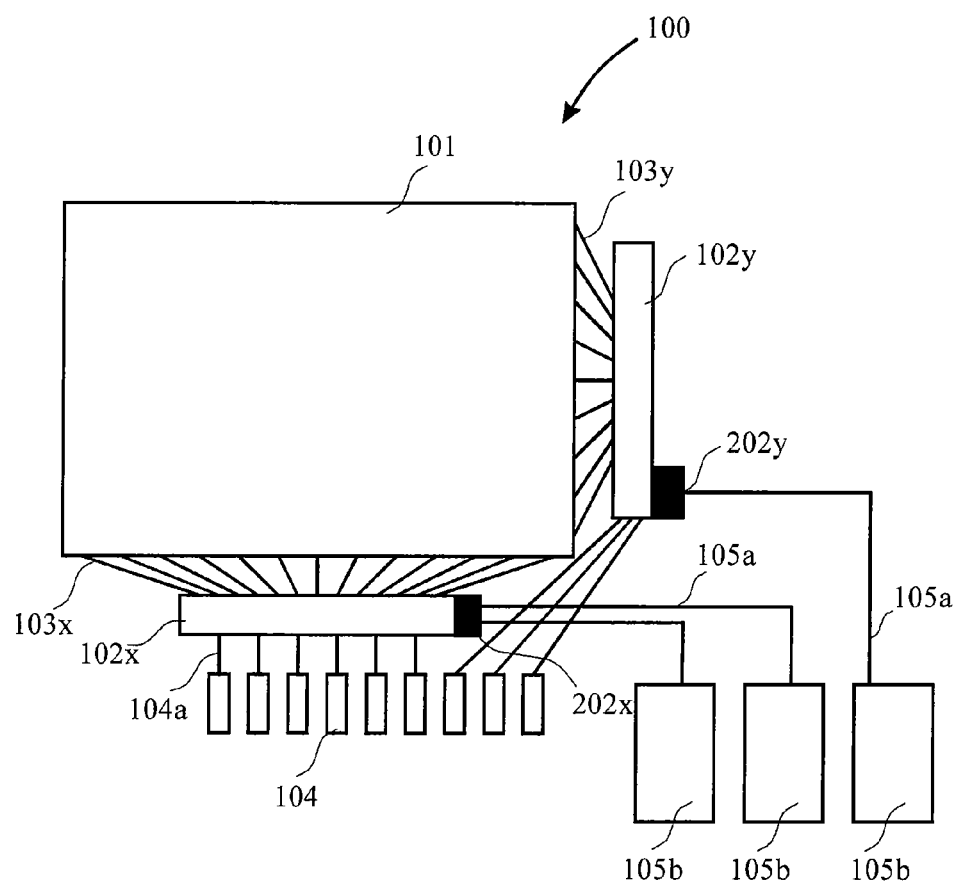
FIG. 2 shows a schematic view of a second embodiment of the present invention.

FIG. 2 shows a schematic diagram of a further embodiment of a display element 100. Components similar or analogous to the embodiment shown in FIG. 1*a* are designated by the same reference numerals and will not be explained in detail in the following. In contrast to FIG. 1*a*, the test contact areas (105*a*+105*b*) of the present embodiment are connected with the drive circuits 102*x* and 102*y*, respectively, via test drive circuits 202*x* and 202*y*, respectively.

Therein, the test drive circuits 202*x* and 202*y* serve to convert the signals received from the test contact areas (105*a* and 105*b*) into signals for the drive circuits 102*x* and 102*y*. The drive circuits 102 can process these converted signals for pattern generation and can provide them to the pixels via the control lines 103.

Several realizations are possible for the test drive circuits 202. On one hand an embodiment similar to FIGS. 3*a* and 3*b* can be realized. Therein, the test drive circuit provides input terminals for the test contact areas and transmits the signals to respective contacts of the drive circuits 102.

On the other hand, also the following embodiment can be realized. In this embodiment, a memory is integrated into the test drive circuit 202. One or more test patterns are stored in that memory. The generation of a test pattern is started or stopped by external signals provided via test contact areas 105. In the case of more than one stored test patterns, also one of the patterns is selected by the external signal. The test drive circuit transmits the signals required for the test pattern to the drive circuits 102. The test pattern is generated on the basis of these signals. According to this embodiment, it is possible to further reduce the number of contact areas or pads required for the testing method. If the generation of the test pattern must only be started or stopped, the number of test contact areas can be reduced to the number of pads for voltage supply and one control pad.

According to another embodiment, the test drive circuit 202 can also serve as a multiplexer. By multiplexing the signals, e.g., in the time domain, it is possible to provide a plurality of signals via a small number of test pads 105*b*. In this embodiment, the buffer or possible timer components required therefore are also integrated on the chip of one of the drive circuits.

Figure 3A:
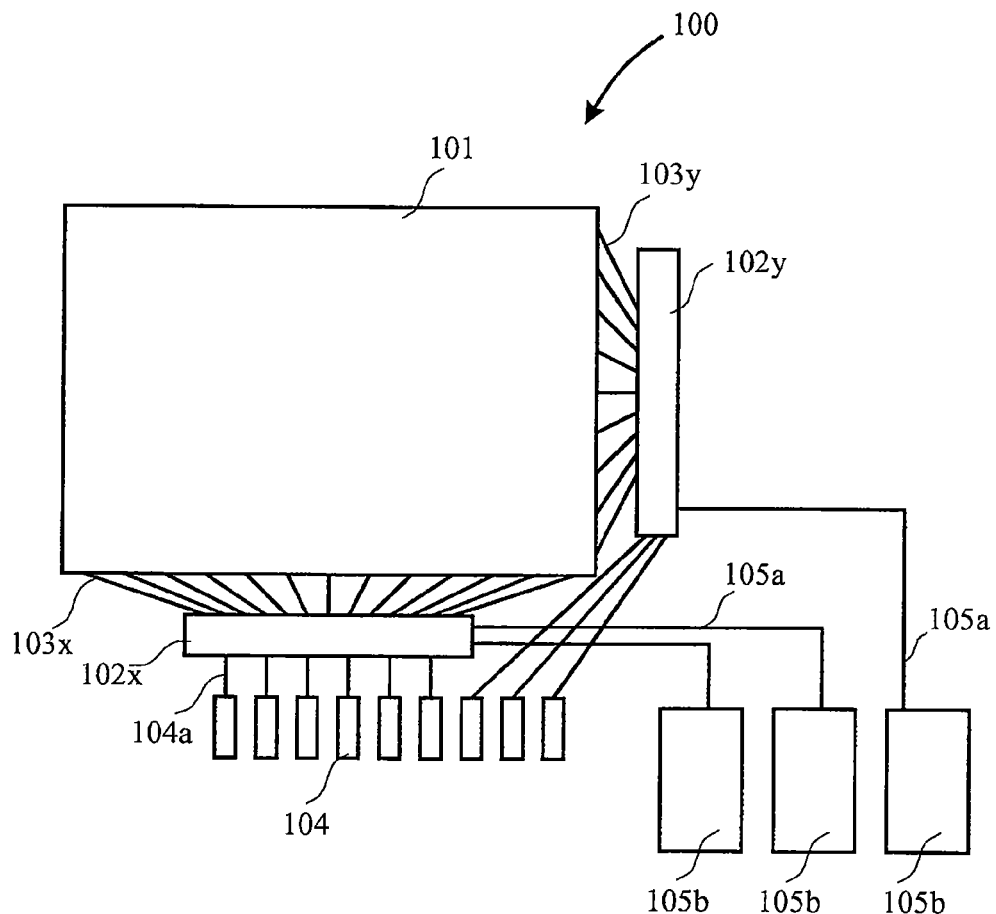
FIG. 3a shows a schematic view of a further embodiment of the present invention.
Figure 3B:
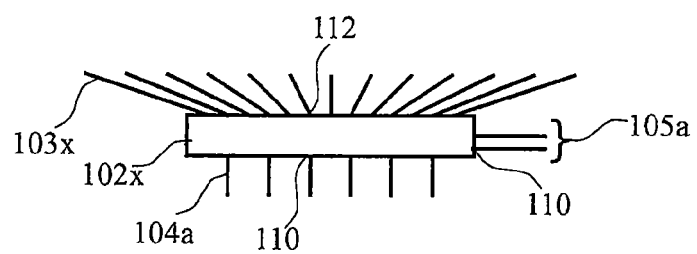

According to the embodiment shown in FIGS. 3*a* and 3*b*, the test contact areas 105 are directly connected with the input terminals of the drive circuit or drive circuits, respectively. For this purpose, either input terminals for the generation of test patterns can be provided with the layout of the drive circuit or a test drive circuit 202, as described with reference to FIG. 2, is integrated into drive circuit 102 so that one must think of it as a single drive circuit 102. It is preferred, inter alia, for this embodiment if the drive circuit provides input terminals for generating a test pattern and if these input terminals are connected with test contact areas.

Analogous to FIG. 1*b*, input terminals 110 and output terminals 112 of drive circuit 102 can be distinguished in FIG. 3*b*.

A possible realization of a test pattern as it can be generated with the present invention is shown in FIG. 4.

FIG. 4 illustrates the individual pixels as boxes. The letters in the boxes symbolize a potential applied to the electrodes of the pixels during generation of a test pattern. For example, different allocation to the pixels can be realized for two voltages V1=−7V and V2=+6V. Which one of pixels A to D corresponds to a certain potential is determined within the setup for the test. For example, A=B=C=V1 and D=V2 can be selected. Thereby, it is achieved that every pixel adjacent to a pixel D with potential V2 are on potential V1. By other selection of allocations, like e.g. A=C=V1 and B=D=V2, horizontal stripes can be generated.

As is apparent from FIG. 4, periodicity in vertical, horizontal or diagonal direction can be generated by such a test pattern. In contrast to the above examples, it is further possible to allow more than two different potentials. Thus, each pixel can be surrounded symmetrically in the horizontal, vertical or diagonal by arbitrary voltages. A further potential can be generated on the electrode of the picture element itself.

Due to such a choice of a test pattern, which should not be understood as a limiting example, every degree of freedom sufficient for a test pattern can be exploited because of the periodic arrangement of the potentials of the electrodes of the picture elements.

For the generation of even more complex test patterns a pattern according to letters A to H can be generated. Thereby, starting out from one picture element a different potential value can be assigned to every neighbouring pixel.

Nevertheless, the driving of such a periodic pattern is less complex than the generation of an arbitrary picture. Therefore, it is possible to reduce the number of test contact areas compared to the number of operational contact areas. This allows to enlarge the contact areas used for the testing method. According to the present invention, this results in an improved testing method since contacting error can be reduced. Moreover, the mechanics for contacting the display to be tested can be designed for high speed. Due to this optimization, the testing method can be further accelerated. Thereby, the throughput of the pieces to be inspected is increased.

The above described embodiments of the present invention can be advantageously applied in a testing method according to the invention as it is described in the following. To reduce production costs, it is necessary for, e.g. a LCD display, to undergo error checking during the manufacturing process. During error checking, the electrodes of the individual picture elements and/or the switching elements for controlling the picture elements are tested. For this purpose, a beam of charged particles (particle beam), like an electron beam or an ion beam, or a laser beam can be used. In the following, the term particle beam comprises laser beams, where the particles are photons, as well as particle beams where the particles are ions, atoms electrons or other particles.

In the following, the testing method is described by example of an electron beam without limiting the invention thereto. A possible testing method is to charge the electrodes of the picture elements on a potential via the lines. This potential or its variation in time can be measured with the particle beam. Thereby, defects like short-circuits or missing contacts as well as parasitic elements and their size can be detected.

In another method, the electrodes of the picture elements are charged by a particle beam and the resulting potentials are measured by a particle beam. Therein, the driving of the lines determines the initial and boundary conditions.

In a further method, the electrodes of the picture elements are charged by a particle beam and the current induced in the lines thereby is measured. Depending on the functioning of the drive circuit, it may be necessary to design the drive circuit so that such a current measurement is enabled at externally accessible contacts of the drive circuit.

In most of these methods it is necessary to provide signals to the lines of the picture elements or to measure the signals at the lines. Therefore, the pads of the display elements must be connected with an external control or external measuring instruments. This contacting can be improved by the apparatus according to the present invention.

In the testing method, the display to be tested is introduced into a chamber and placed under the electron beam. For using the electron beam, the chamber has to be evacuated down to a pressure of below $10^{-4}$ mbar. Furthermore, a contacting block is connected with the test contact areas according to the invention. Typically, the contacting block is a mechanics for making electrical contact between a testing device and the contact areas of the display. Then, signals are transmitted to the contact areas. Depending on the signals, the electrodes or individual electrodes of the picture elements are brought to defined potentials. Thus, a test pattern is generated. The control of the testing device tests the potentials of individual electrodes in that the electron beam is, inter alia, deflected by deflectors. Since no sufficient deflection can be realized for large displays, one portion of the display is tested first and, subsequently, the display is shifted by a shifting unit. It is important for reliable testing that the contacting of the pads is continuously maintained or can be re-established reliably and quickly. According to the present invention, this is enabled by the test contact areas. After the shifting, another portion is tested. The interplay of shifting the display and testing of a portion can be continued until the whole display is tested or all displays on the substrate have been tested.

Inter alia, the testing speed is important for the above described testing method to achieve high throughput. Furthermore, the measurement must be very reliable because even 0.1 per mil of defective picture elements preclude use of the display. When defects are detected at an early stage of the production process, error correction can be accomplished by, e.g., an ion beam or laser beam.

Since even small leakage currents may result in noticeable image distortion due to parasitic elements, it is further preferred to equip the testing device with sensitive testing methods. Therefore, electromagnetic interfering fields possibly interfering with the electron beam or the measurement of secondary electrons or backscattered electrons must be largely avoided.

For the above mentioned reasons, the apparatus according to the present invention are preferred for the above described testing method because contacting the display within the testing device is facilitated due to the test contact areas. Therefore, it is possible to realize an efficient contacting. This contacting complies with the above mentioned boundary conditions.

Without referring to specific embodiments, the following preferred aspects of the invention can be utilized in general for preferred solutions of the problem underlying the present invention.

It is preferred if the second arrangement of contact areas is connected with the drive circuit via the first arrangement of contact areas. Therein, the contact areas for generating the test pattern can be connected with a plurality of contact areas for regular operation. Furthermore, the number of test contact areas can especially preferably be reduced in that not all operational contact areas connected with the drive circuit are connected with a test contact area.

Furthermore, it may be advantageous if a second arrangement of contact areas is connected with the drive circuit via a test electronics. Therein, it is especially preferred if the test electronics comprises a memory from which the test pattern to be generated is read. This test pattern can be provided to the drive circuit.

Also, it may be preferable if the second arrangement of contact areas is directly connected with the drive circuit. Therein, it is especially preferable if the drive circuit is such that it comprises circuits for processing the signals from the test contact areas.

The above mentioned aspects serve to further facilitate the testing process in that a separation of contact areas for the testing process and for regular picture generation is accomplished. Furthermore, it possible due to these preferred aspects to reduce the number of contact areas for testing and, thus, to provide the option of enlarged contact areas for the testing procedure.

According to a preferred aspect, the number of second pads of the second arrangement of contact areas is maximum 90% of the number of first pads of the first arrangement of contact areas. Preferably, the number of second pads is maximum 50%, more preferably 20%, the number of first contact areas. Thus, it is possible and especially advantageous to provide the second pads of the second arrangement of contact areas with a dimension of at least 100 µm, preferably a dimension of 0.5 mm, and especially preferred a dimension of 2 mm.

If the test drive circuit according to a preferred embodiment of the present invention includes a memory, it may be advantageous that the number of second pads of the second arrangement of contact areas used for signal transmission is one.

Without referring to specific embodiments, the following preferred aspects of the present invention can be applied, in general, for the testing of an optoelectronic device according to the present invention.

When testing an optoelectronic device according to the present invention, it is preferred that the input signals generate a periodic test pattern. Therein, test patterns which are periodic in a vertical, horizontal or diagonal direction are especially preferred.

Moreover, the present invention has advantages when, during testing, a vacuum is used in the vicinity of the optoelectronic device to be tested or when the testing method comprises the following steps: testing the picture elements in a portion of the matrix of picture elements or all picture elements of a smaller matrix; shifting the optoelectronic device, and testing of picture elements in a further portion of the matrix of picture elements or a further small matrix.

What is claimed is:
1. A drive electronics for driving an optoelectronic device with a matrix of picture elements, comprising:
   a drive circuit, wherein the drive circuit comprises:
      input terminals for receiving external signals;
      means for modifying the external signals to form modified signals; and
      output terminals connected for providing the modified signals to the matrix of picture elements for picture generation during normal operation and for generation of a test pattern during test mode of the matrix of picture element;

a first arrangement of contact areas connected with the input terminals of the drive circuit, wherein the first arrangement of contact areas serves for picture generation during normal operation; and a second arrangement of contact areas connected with the input terminals of the drive circuit directly or via another component, wherein the contact areas of the second arrangement of contact areas are larger than the contact areas of the first arrangement of contact areas, the second arrangement of contact areas serves for pattern generation during test mode, the second arrangement of contact areas is connected to the input terminals of the drive circuit and can be contacted by an external control to transfer the external signal from the external control to the drive circuit for test pattern generation.

2. The drive electronics according to claim 1, wherein:
the number of input terminals of the drive circuit by which the drive circuit is connected with the second arrangement of contact areas is at most 5% of the number of output terminals of the drive circuit by which the drive circuit is connected with the control lines of the matrix of picture elements.

3. The drive electronics according to claim 1, wherein:
the second arrangement of contact areas is connected with the drive circuit via the first arrangement of contact areas, such that the second arrangement of contact areas is connected with the drive circuit via the first arrangement of contact areas by means of switching elements or components or such that the second arrangement of contact areas is directly connected with the drive circuit via the first arrangement of contact areas.

4. The drive electronics according to claim 1, wherein:
the second arrangement of contact areas is connected with the drive circuit via a test electronics.

5. The drive electronics according to claim 1, wherein:
the second arrangement of contact areas is directly connected with the drive circuit.

6. The drive electronics according to claim 5, wherein:
test circuits are integrated into the drive circuit.

7. The drive electronics according to claim 1, wherein:
the first arrangement of contact areas comprises one or more first pads, the second arrangement of contact areas comprises one or more second pads, and the number of second pads of the second arrangement of contact areas is at most 90% of the number of first pads of the first arrangement of contact areas.

8. The drive electronics according to claim 1, wherein:
the first arrangement of contact areas comprises one or more first pads, the second arrangement of contact areas comprises one or more second pads, and the second pads of the second arrangement of contact areas are larger than the first pads of the first arrangement of contact areas.

9. The drive electronics according to claim 1, wherein:
the second arrangement of contact areas comprises one or more second pads, and the second pads of the second arrangement of contact areas have a dimension of at least 100 μm.

10. The drive electronics according to claim 1, wherein the matrix of picture element is provided on a substrate, and the drive electronics is provided on the substrate.

* * * * *